3,252,954
ORGANIC SEMICONDUCTOR SOLID POLYMER
OF THE FORMULA $(-CH=CF-)_n$
John D. Calfee and Bernard S. Wildi, St. Louis, Mo., assignors to Monsanto Company, a corporation of Delaware
No Drawing. Filed June 27, 1963, Ser. No. 290,943
2 Claims. (Cl. 260—92.1)

The invention relates to new organic semiconductor material and more particularly to dehydrochlorinated polyvinylidenechlorofluoride and to semiconductor bodies made therefrom. These semiconductor bodies can suitably be in the form of discs, wafers, bars, rods, rectangular parallelepipeds, round, or most any geometric shape. This application is a continuation-in-part of copending application Serial No. 31,513, filed May 25, 1960, now abandoned.

The polyvinylidene chlorofluoride starting material for the compositions of the invention are made from the monomer 1-chloro-1-fluoro-ethylene by polymerization in the presence or absence of catalysts. One method of making the polyvinylidene chlorofluoride is described in U.S. 2,362,094. This polymer is a rubbery solid and can be softened and worked at moderate temperatures. It is generally soluble in such common and inexpensive solvents as dioxane, acetone, ethyl acetate, chlorofrom and benzene. Furthermore, the polymer is characterized by being non-inflammable. It is a vinyl polymer having no appreciable amount of crosslinking which is especially indicated by its solubility in a wide variety of solvents. This polymer is largely a straight-chain typical vinyl polymer having a relatively low degree of branching. Polyvinylidene chlorofluoride having improved properties for certain uses can also be prepared according to the method of U.S. 2,777,835 under high pressure, and these polymers have increased toughness, molecular weight, resistance to flow at elevated temperatures, and hot mill processability as compared to the polymers prepared according to the specific teaching of U.S. 2,362,094. The polymers of the method of U.S. 2,777,835 are rubbery solids and they are soluble in a large variety of organic solvents indicating no appreciable amount of crosslinking. Either the method of U.S. 2,362,094 or the method of U.S. 2,777,835 provides suitable polymers from which the semiconductive dehydrochlorinated polyvinylidene chlorofluoride compositions and semiconductor bodies of this invention can be made. Thus, the polymeric polyvinylidene chlorofluoride, from which the compositions of matter of the invention are made, is of the formula $$(-CH_2CClF-)_n$$

wherein $n$ represents the degree of polymerization.

The polyvinylidene chlorofluoride is dehydrochlorinated, using, for example, quinoline, triethylamine, sodium or potassium hydroxide, pyridine, or smaller HCl acceptors preferably at elevated temperatures in the range of about 100° C. to 300° C. Alternatively, the dehydrochlorination can be carried out at temperatures above about 200° C. to about 350° C. thermally without the need for HCl acceptors. Normally it will be preferred to carry out the dehydrochlorination in the presence of a solvent for the undehydrochlorinated polymer, and suitable solvents are named hereinabove; and, dehydrochlorinating agents such as quinoline, pyridine and the like can also serve as solvents as well as dehydrochlorinating agents. The dehydrochlorinating agent whether or not used as a solvent should be present in at least equivalent amount to the amount of HCl which theoretically can be removed from the polymer by dehydrochlorination. Reflux temperatures of the solvent are usually suitable for carrying out the dehydrochlorination and making the polymeric materials of the invention; however, higher temperatures can be used by carrying out the reaction in an autoclave under pressure. In an autoclave reaction normally it will be preferred to blanket the reactants with nitrogen or some other inert gas to inhibit the polymerization of the unsaturated polymeric material of the invention. Preferred compositions of the invention have substantially all, i.e. 90% or more, of the chlorine removed from the polymer by dehydrochlorination and retain substantially all, i.e. 90% or more, of the fluorine. That is, the compositions of the invention are of the formula $$(-CH=CF-)_o(-CH=CCl)_p(-CH_2CClF-)_q$$

and the percentage of $o$ components is 90% or more and may approach 100% very closely. Thus, the compositions of the invention consist essentially of $(-CH=CF-)_n$. The product of this invention generally has a brown-black to a bluish-black color and the product is in general insoluble in organic solvents i.e. is insoluble in most, if not all, organic solvents. The product of the invention has semiconductor properties, i.e. a resistivity in the range of $10^9$ to $10^{-3}$ ohm-centimeters at 25° C.

This dehydrochlorinated material then is the useful semiconductor material of the invention which can be formed or pelleted by pressure with or without the application of heat to form the semiconductor bodies useful in barrier layer devices. If desired, binders can be used to aid in the formation of the semiconductor bodies but are not necessary. The type and/or degree of conductivity of these semiconductor bodies can be further varied by heating under high vacuum or in the presence of an inert atmosphere at temperatures in the range of about 180–700° C. preferably 300–600° C.

It is an object of this invention to provide new and useful compositions of matter.

It is another object of this invention to provide new components or bodies useful in barrier layer devices.

These and other objects of the invention will be apparent as the detailed description of the invention proceeds.

The invention will be more clearly understood from the following detailed description of specific examples thereof.

*Example 1*

This example describes the preparation of the polyvinylidene chlorofluoride. The reaction is an electrically heated stainless steel bomb of 200 cc. capacity which is capable of withstanding a working pressure of 40,000 pounds per square inch. The bomb is fitted with a ⅛" inside diameter thermowell, made of high pressure tubing, which passes through the center of the bottom closure and extends into the middle of the reaction space. Purpose of the well is to permit the cobalt-60 (50 millicurie source) to be surrounded by materials being subjected to γ-radiation. The cobalt-60 is in the form of thin wire and encased in a 5-inch capsule which can be run in or out of the reactor by remote control. A lead shield is employed around the cobalt-60 when not in use. The high pressure bomb is charged with 100 grams of vinylidene chlorofluoride monomer, i.e. 1-chloro-1-fluoro-ethylene. The bomb is pressured up with water to 35,000 pounds per square inch gauge (p.s.i.g.) and the system is connected with an automatic pressure controller so that upon a 2000 pound per square inch pressure drop the reactor is automatically repressured to 35,000 p.s.i.g. Polymerization temeprature is 25° C. and reaction time is 65 hours. Dropping pressure indicates polymerization is taking place after the cobalt-60 source is inserted to the thermowell. At the end of the run a good yield of clear tough polymer is recovered. This example describes one method of preparing polyvinylidene chlorofluoride, but the polymer can as well be prepared by peroxide or azo catalysis in a conventional manner, and the polymer can also be prepared in the absence of such catalysts as indicated in U.S. 2,362,094.

Example 2

This example describes the dehydrochlorination of the polymer of Example 1 using quinoline as an HCl acceptor.

A sample of 6 grams of the polymer of Example 1 and 150 ml. of xylene is heated to reflux (140° C.) and 9.0 grams of quinoline is added. After one hour of heating a solid material separated out, and another 9.0 grams of quinoline is added. Heating is continued for two more hours after which time the reaction mixture is filtered. The residue is a black material. This residue is washed twice with ethanol and three times with hot water (90° C.) and finally twice with ethanol. The residue is then dried at 90° C. at 5 mm. of Hg absolute pressure for 18 hours. This dried material is jet black with a bluish tint. The product recovered is 0.65 gram.

This describes the making of a pellet or wafer from the powdered material. A sample of the powdered product of Example 2 is put in a ½" diameter die and pressed at force of 20,000 pounds at room temperature to form a pellet or wafer suitable for use in barrier layer devices. Alternatively, the material can be hot pressed at a temperature of about 150° C.

Example 3

This example describes the dehydrochlorination of polyvinylidene chlorofluoride by heat. A sample of 6.3 grams of polyvinylidene chlorofluoride is cut into strips 0.5–2 mm. wide by 2–4" long and placed in a test tube in a vacuum sublimator. The vacuum sublimator is evacuated to an absolute pressure of 0.18–1.0 mm. of Hg and heated to 225° C. for 18 hours. The weight of the material after heating is 2.6 grams showing a weight loss of 3.7 grams indicating not only the chlorine but some fluorine removal in the dehydrochlorination step; however, a portion of the loss may be due to depolymerization. The product is black-brown when finely ground.

Example 4

This example describes the determination of the electrical properties of the product of Example 2. The product of Example 2 is tested in powdered form as follows: The test cell for the electrical measurement is a hollow quartz cylinder placed upright on a platinum plate which seals the bottom opening of the cylinder. The internal diameter of the quartz cylinder is ¾". The powdered sample to be tested is added to the quartz cylinder to a depth of 1–2 millimeters. A platinum slug is inserted to the top of the quartz cylinder and a pressure of 900 g./sq. cm. is applied through this platinum slug to the powdered sample. The sample is heated by conduction through the platinum plate to a temperature of about 280° C. under a vacuum of about $10^{-3}$ mm. of Hg at least overnight. The next day the sample is subjected to a series of treatments involving evacuation under high vacuum, purging with nitrogen, evacuation under high vacuum and finally to a nitrogen atmosphere of 5" of Hg absolute pressure for the electrical testing. During the electrical testing the pressure of 900 g./sq. cm. is maintained on the powdered sample as described above. Resistivity measurements are made on the sample at room temperature and at elevated temperatures up to 140° C. The resistivity at 25° C. is $6.3 \times 10^6$ ohm-centimeters and the resistivity at higher temperatures is somewhat reduced. The electrical resistance measurements are made across the thickness of the sample via the platinum plate and the platinum slug. From these electrical resistance measurements the resistivity is calculated.

Barrier layer devices in which the semiconductor bodies of the invention can be used are such devices as thermoelectric devices, photoelectric devices, resistors, thermistors, transistors, diodes, power rectifiers, etc.

Although the invention has been described in terms of specified embodiments which are set forth in considerable detail, it should be understood that this is by way of illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed is:

1. A polymeric material consisting essentially of solid polymer of the formula $(-CH=CF-)_n$ wherein $n$ represents the degree of polymerization, said polymer having semiconductor properties and being insoluble in xylene.

2. A semiconductor body of a pellet of polymeric material consisting essentially of solid polymer of the formula $(-CH=CF-)_n$ wherein $n$ represents the degree of polymerization, said pellet having semiconductor properties and being insoluble in xylene.

References Cited by the Examiner
UNITED STATES PATENTS

| | | | |
|---|---|---|---|
| 2,261,757 | 4/1941 | Fawcett | 260—96 |
| 2,362,094 | 11/1944 | Renoll | 260—92.1 |
| 2,606,177 | 8/1952 | Downing | 260—92.8 |
| 2,777,835 | 1/1957 | Calfee | 260—92.1 |

JOSEPH L. SCHOFER, *Primary Examiner.*